Nov. 27, 1951     J. A. BEDE     2,576,558

PAINT HEATER

Filed Nov. 24, 1948

INVENTOR.
JAMES A. BEDE
BY
Oberlin & Limbach
ATTORNEYS.

Patented Nov. 27, 1951

2,576,558

UNITED STATES PATENT OFFICE 2,576,558

PAINT HEATER

James A. Bede, Cleveland, Ohio

Application November 24, 1948, Serial No. 61,801

15 Claims. (Cl. 219—39)

The present invention while relating generally as indicated to improvements in paint heaters is more particularly concerned with paint heaters employing an electrically heated heat transfer block formed with a passage through which liquid coating material (hereinafter referred to generally as "paint") such as lacquer, enamel, varnish, etc., may be circulated and thus heated to a desired temperature prior to atomization thereof.

It is one primary object of this invention to provide a heater by which very uniform and efficient heating of the coating material is obtained.

Another object is to provide a heater in which the atomizing air may also be heated to the same or different temperature from the coating material without changing the setting of the heater.

Another object is to provide an electrically heated unit having one heating element cut-off thermostat therein responsive to heating of the heat transfer block to a predetermined temperature, a second safety thermostat which is operative to cut off the heating element in the event of malfunction of the first said thermostat and a temperature responsive fusible link which breaks the power supply connection to the heating element in the event that both thermostats fail to function as required.

Another object is to provide an electrically heated unit of explosion-proof construction, conforming with recognized electric industry codes.

Another object is to provide a light-weight and compact heater which may be readily transported from one place of use to another.

Another object is to provide a heater employing a heat transfer block of aluminum which does not require any attention and may be heated without melting, over a wide temperature range adequate for the present purposes.

Another object is to provide a heater of extremely simple construction requiring no maintenance.

Another object is to provide an insulated heater whereby a minimum of heat is lost by radiation.

Another object is to provide a unique heater construction for heating both the coating material and the atomizing air therefor to a desired temperature, the latter being desirably heated without changing the setting of the electric heating element employed for heating the coating material.

Other objects and advantages will become apparent as the following description proceeds.

To the accomplishment of the foregoing and related ends, the invention, then, comprises the features hereinafter fully described and particularly pointed out in the claims, the following description and the annexed drawing setting forth in detail certain illustrative embodiments of the invention, these being indicative, however, of but a few of the various ways in which the principle of the invention may be employed.

Figure 1:
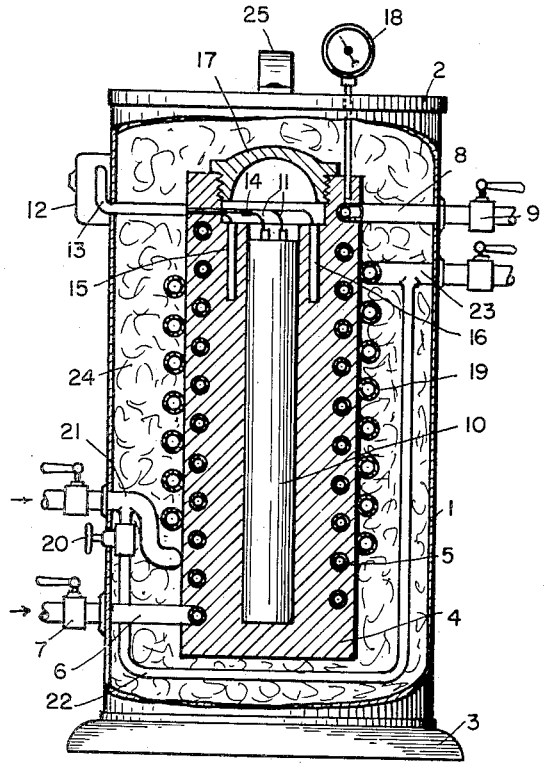
Fig. 1 is an elevation view of one form of heater partially in cross-section to show the internal construction thereof.

Referring now to the drawing and first more especially to Fig. 1 thereof there is shown a heater comprising a cylindrical housing 1 fabricated from sheet metal or the like with caps 2 and 3 closing the top and bottom ends of said housing. Centrally within said housing 1 is a vertically disposed cylindrical block 4 of aluminum or like good heat conducting material which is solid at the temperatures involved in the heating of coating materials of the character referred to, 530° F. being herein considered a dangerous temperature not to be exceeded. Said cylindrical block 4 hereinafter referred to as the heat transfer block is cast around a helically coiled tube 5 provided with an inlet conduit 6 at its lower end controlled by a valve 7 and an outlet conduit 8 at the upper end controlled by a valve 9.

Centrally within said block 4 and extending longitudinally for the entire length of coil 5 is an electric immersion heater 10, the power leads 11 of which extend laterally through said block 4 and through said housing 1 into a conventional electric outlet box 12. Preferably a conduit 13 is attached to said box 12 and to said block 4. In one of said power leads 11 is a fusible link 14 arranged to melt at a temperature of less than 530° F. to thus open the heater circuit in the event that the hereinafter described thermostats fail to function.

Also extending into separate bores in said block are two thermostats 15 and 16 arranged respectively to open the heater circuit when the block 4 or the coating material flowing through the coil 5 attains a predetermined temperature and to open the heater circuit upon a further rise in temperature as occasioned by the failure of said first-named thermostat to function as required. As aforesaid, in the event that both thermostats 15 and 16 fail to function, then the fusible link 14 will be effective to open the heater circuit and thus obviate dangers incident to heating the coating material above the indicated limit of 530° F.

As shown in Fig. 1, the heating element 10, thermostats 15 and 16, and fusible link 14 are disposed in an explosion-proof chamber formed by the heat transfer block 4 and the convexly curved cap 17 threaded into the upper end of said block. A temperature gage 18 is inserted into the upper end of said block to indicate the temperature of the coating material in the coil 5 just prior to the emergence thereof from the outlet 8.

It is preferred that the flow of coating material be upward through coil 5 as shown to minimize clogging and settling of the pigment of the coating material.

Surrounding the heat transfer block 4 is a second coil 19 through which atomizing air is adapted to be flowed and thus heated prior to being used for atomizing the heated coating material. The temperature to which the air is heated, usually less than that to which the coating material is heated, is controlled by the valve 20 which allows a selected proportion of the air to bypass the coil 19 and flow directly from the inlet conduit 21 through the bypass conduit 22 contained within housing 1 to the outlet conduit 23. In this way, the unheated and heated air will be mixed at the outlet conduit 23.

The heat transfer block 4 is maintained in spaced relation to the side, top, and bottom walls of housing 1 by means of the insulating material 24 therebetween which minimizes loss of heat and keeps the housing 1 relatively cool at all times.

The cap 2 of housing 1 is provided with a handle 25 thereon for facilitating lifting of the heater and transporting it from one place to another, it being noted that such heater is relatively light because of the employment of an aluminum heat transfer block and light-weight insulation and a light-weight steel shell around the insulation.

Figure 2:
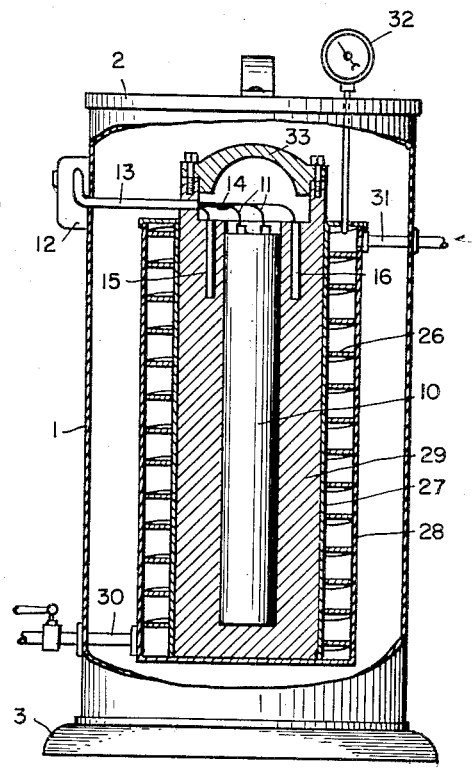
Fig. 2 is a view similar to Fig. 1 illustrating a modification.

With respect to Fig. 2, the heater illustrated therein includes a housing 1 similar to that illustrated in Fig. 1 and a similar heating element 10. The principal distinguishing feature is the formation of the helical passage for coating material by a metal fin 26 helically wound on edge and welded to either or both of the steel inner and outer jackets 27 and 28, the jacket 27 closely embracing the heat transfer block 29 and the jacket 28 being radially spaced from the first-named jacket. The outer jacket 28 is provided with radially extending conduits 30 and 31 adjacent the lower and upper ends thereof whereby coating material forced into the lower conduit 30 flows upwardly through the helical passageway defined by said fin 26 and jackets 27 and 28 and emerges in a desirably heated condition from the outlet conduit 31 at the upper end. In this case, the temperature indicating gauge 32 is inserted into the coating material passageway whereby to read directly the temperature of the coating material just prior to its emergence from the heater. The explosion-proof cap 33 is herein bolted on rather than screwed on as shown in Fig. 1. Otherwise the thermostats 15 and 16, fusible link 14, outlet box 12, and conduit 13, etc., are the same as previously described in connection with Fig. 1. In Fig. 2, the coil 19 for heating air has been omitted for sake of clarity, it being understood that the same arrangement as shown in Fig. 1 may be adopted in the Fig. 2 construction, if desired.

Figure 3:
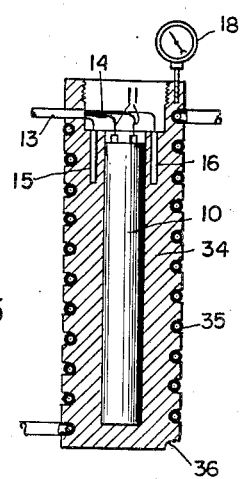
Fig. 3 is a cross-section view of a modified form of heat exchange block and electric heating element therein.

Referring now to Fig. 3, the heat exchange block 34, preferably of aluminum, is generally similar to the block illustrated in Fig. 1 with the exception that the coil 35 providing a passageway for the coating material is threaded onto a peripheral helical groove 36 formed on said block. Thus, when servicing the heater, it is a simple matter to unthread the heat transfer block 34 from the coil 35 and thus service or replace either one or both.

Figure 4:
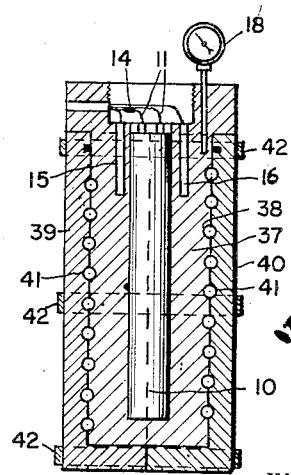
Fig. 4 is a view similar to Fig. 3 illustrating a still further modification.

In Fig. 4 is shown a composite construction in which the heat transfer block includes a cylindrical inner part 37 formed with a helical groove 38 thereabout and an outer split part 39—40 fitted over said cylindrical portion also formed with a matching helical groove 41 so formed that when the parts are assembled as shown a helical passageway for coating material is formed. Preferably the outer part 39—40 comprises semi-circular sections held together as by straps 42 therearound. The heating element 10, thermostats 15 and 16, fusible link 14, temperature indicating gauge 18, etc., are the same as illustrated in Fig. 1. With this form of heat exchange block the cleaning of the passageway for coating material is greatly facilitated in that when the parts of the block are disassembled the helical grooves 38 and 41 are readily accessible for brushing and wiping.

Having thus described several forms of heaters it is apparent that very uniform heating of coating material is attained and with a minimum of upkeep of the equipment and with utmost safety to the workmen using the equipment, said heaters admirably fulfilling the objects of the invention as heretofore stated. It has been found that by heating paint it becomes more readily atomizable and a much more even spraying thereof can be effected with a smoother film on the article sprayed, less thinner is required, and thicker coatings can be applied without sags because of the faster setting up of the paint.

Furthermore by heating the atomizing air to a predetermined temperature, usually less than that to which the coating material is heated, there is effected a much better atomization of the paint with less air and prevents chilling of the paint particles by offsetting the natural refrigerating action occuring during atomization, the atomized paint particles are in better condition to flow out smoothly upon the surface of the article sprayed than if such heating of the air is omitted.

Referring further to the explosion-proof chamber formed by the heat transfer block and cap thereon, it is preferred that a minute leakage passageway or clearance be provided between these parts so that in the event of a spark and presence of explosive vapor in such chamber, any flames will be arrested by the cooling of the hot gases while traveling at high velocity through such clearance. The chamber forming parts are of such strength that an explosion under worst conditions will not shatter said parts. In this way the parts need not be as bulky as otherwise necessary if gaskets or the like are employed in the attempt to provide a vapor-proof chamber.

A spray painting process involving heating of the paint, the atomizing air and the article to be sprayed is disclosed in my co-pending application Serial No. 25,102, filed May 5, 1948, now abandoned and a paint heating apparatus over which the present invention has several improvements is disclosed in my co-pending application Serial No. 763,488, filed July 25, 1947, now Patent No. 2,481,813.

Other modes of applying the principle of the invention may be employed, change being made as regards the details described, provided the features stated in any of the following claims, or the equivalent of such, be employed.

I therefore particularly point out and distinctly claim as my invention:

1. A paint heater comprising a housing, a heat exchange block within said housing, an electric heating element in said block having power leads extending through said housing, temperature responsive means in said block operative to open the heating element circuit upon heating of said block to a predetermined temperature, a cap connected to said block confining said element and means within said block and forming an explosion-proof chamber with said block which includes a minute leakage passageway communicating the chamber with the exterior of said block, means forming a passageway heated by said block through which paint is adapted to be flowed and thus heated, and inlet and outlet conduits leading from the exterior of said housing to opposite ends of such passageway.

2. A paint heater comprising a housing, a heat exchange block within said housing, an electric heating element in said block having power leads extending through said housing, means forming two separate passageways heated by said block through which paint and atomizing air are respectively adapted to be flowed and thus heated, separate inlet and outlet conduits leading from the exterior of said housing to opposite ends of such passageway, a bypass conduit within said housing remote from the influence of heating by said block leading from the inlet conduit to the outlet conduit of one of such passageways, and a throttling valve in said bypass conduit operative to desirably proportion the flow of fluid through such one passageway and bypass conduit whereby to attain a desired final temperature thereof at the outlet independent of the temperature to which the fluid adapted to be flowed through the other passageway is heated.

3. A paint heater comprising a housing, an upright cylindrical heat exchange block within said housing, an electric heating element centrally within said block having power leads extending through said housing, means forming two separate passageways heated by said block through which paint and atomizing air are respectively adapted to be flowed and thus heated, and separate inlet and outlet conduits leading from the exterior of said housing to opposite ends of such passageways, the passageway for heating atomizing air comprising a helical coil concentric with said heating element and in contact and encircling said block, and the passageway for heating paint likewise being of helical form but disposed within said helical coil and thus closer to said heating element.

4. A paint heater comprising a housing, a heat exchange block within said housing, an electric heating element in said block having power leads extending through said housing, temperature responsive means in said block operative to open the heating element circuit upon heating of said block to a predetermined temperature, a cap connected to said block confining said element and means within said block and forming an explosion-proof chamber with said block which includes a minute leakage passageway communicating the chamber with the exterior of said block, means forming a passageway heated by said block through which paint is adapted to be flowed and thus heated, and inlet and outlet conduits leading from the exterior of said housing to opposite ends of such passageway, said means forming such passageway comprising a helical tube around which said block is cast.

5. A paint heater comprising a housing, a heat exchange block within said housing, an electric heating element in said block having power leads extending through said housing, temperature responsive means in said block operative to open the heating element circuit upon heating of said block to a predetermined temperature, a cap connected to said block confining said element and means within said block and forming an explosion-proof chamber with said block which includes a minute leakage passageway communicating the chamber with the exterior of said block, means forming a passageway heated by said block through which paint is adapted to be flowed and thus heated, and inlet and outlet conduits leading from the exterior of said housing to opposite ends of such passageway, said means forming such passageway comprising a vertically disposed helical tube around which said block is cast, said inlet conduit being connected to the lower end of said tube and said outlet conduit being connected to the upper end of said tube.

6. A paint heater comprising a housing, a heat exchange block within said housing, an electric heating element in said block having power leads extending through said housing, temperature responsive means in said block operative to open the heating element circuit upon heating of said block to a predetermined temperature, a cap connected to said block confining said element and means within said block and forming an explosion-proof chamber with said block, means forming a passageway heated by said block through which paint is adapted to be flowed and thus heated, and inlet and outlet conduits leading from the exterior of said housing to opposite ends of such passageway, said means forming such passageway comprising an inner jacket around said block and in contact therewith, an outer jacket forming an annular space around said inner jacket, and a helical fin in such annular space in heat-conducting relation to said inner jacket, said conduits extending through the wall of said outer jacket into such annular space.

7. A paint heater comprising a housing, a heat exchange block within said housing, an electric heating element in said block having power leads extending through said housing, temperature responsive means in said block operative to open the heating element circuit upon heating of said block to a predetermined temperature, a cap connected to said block confining said element and means within said block and forming an explosion-proof chamber with said block, means forming a passageway heated by said block through which paint is adapted to be flowed and thus heated, and inlet and outlet conduits leading from the exterior of said housing to opposite ends of such passageway, said block comprising an inner part formed with a helical groove therearound, a split outer part into which said inner part fits forming a helical passageway constituting the aforesaid passageway through which paint is adapted to be circulated, and means detachably connecting said inner and outer parts together.

8. A paint heater comprising a housing, a heat exchange block within said housing, an electric heating element in said block having power leads extending through said housing, temperature responsive means in said block operative to open the heating element circuit upon heating of said block to a predetermined temperature, a cap connected to said block confining said element and means within said block and forming an explosion-proof chamber with said block which includes a minute leakage passageway communicating the chamber with the exterior of said block, means forming a passageway heated by said block through which paint is adapted to be flowed and thus heated, and inlet and outlet conduits leading from the exterior of said housing to opposite ends of such passageway, said block being formed with a helical groove thereabout, and the means forming such passageway comprising a helical tube threaded on such groove and snugly fitting over said block.

9. A paint heater comprising a heat exchange block formed with a bore extending longitudinally thereof from one end toward the other end, an electric heating element removably fitted into such bore and having power leads adapted for connection with a source of electric energy, temperature responsive means in said block operative to open the heating element circuit upon heating of said block to a predetermined temperature, a closure member removably connected to said block for enclosing said element within said block, said block and closure member forming a substantially closed chamber in which the heating element circuit is opened and closed by said temperature responsive means, and means forming a passageway heated by said block through which paint is adapted to be flowed and thus heated.

10. A paint heater comprising a heat exchange block formed with a bore extending longitudinally thereof from one end toward the other end, an electric heating element of cross-section complementary with that of such bore and slidably fitted thereinto from such one end of said block, said element having power leads adapted for connection with a source of electric energy, temperature responsive means in said block operative to open the heating element circuit upon heating of said block to a predetermined temperature, a closure member removably connected to said block at such one end for enclosing said element within said block, said block and closure member forming a substantially closed chamber in which the heating element circuit is opened and closed by said temperature responsive means, and means forming a passageway heated by said block through which paint is adapted to be flowed and thus heated.

11. A paint heater comprising a heat exchange block formed with a bore extending longitudinally thereof from one end toward the other end, an electric heating element removably fitted into such bore and having power leads adapted for connection with a source of electric energy, temperature responsive means in said block operative to open the heating element circuit upon heating of said block to a predetermined temperature, a closure member removably connected to said block for enclosing said element within said block, said block and closure member forming a substantially closed chamber in which the heating element circuit is opened and closed by said temperature responsive means, and means forming a passageway heated by said block through which paint is adapted to be flowed and thus heated, such passageway being in the form of a helix extending longitudinally of said block and around said element in intimate heat conducting relation with said block.

12. A paint heater comprising a heat exchange block formed with a bore extending longitudinally thereof from one end toward the other end, an electric heating element removably fitted into such bore and having power leads adapted for connection with a source of electric energy, a closure member removably connected to said block for enclosing said element within said block, said block and closure member forming a substantially closed chamber, means in such chamber for opening and closing the heating element circuit, and means forming a passageway heated by said block through which paint is adapted to be flowed and thus heated.

13. A paint heater comprising a heat exchange block, an electric heating element in said block having power leads for connection with a source of electrical energy, temperature responsive means in said block operative to open the heating element circuit upon heating of said block to a predetermined temperature, a cap connected to said block confining said element and means within said block and forming an explosion-proof chamber with said block which includes a minute leakage passageway communicating the chamber with the exterior of said block, and means forming a passageway heated by said block through which paint is adapted to be flowed and thus heated.

14. A paint heater comprising a heat exchange block, an electric heating element in said block having power leads adapted for connection with a source of electric energy, a closure member removably connected to said block for enclosing said element within said block, said block and closure member forming a substantially closed chamber, means in such chamber for opening and closing the heating element circuit, and means forming a passageway heated by said block through which paint is adapted to be flowed and thus heated.

15. A paint heater comprising a heat exchange block, an electric heating element in said block having power leads for connection with a source of electrical energy, temperature responsive means in said block controlling energization and deenergization of said element, a cap connected to said block confining said element and means within said block and forming an explosion-proof chamber with said block which includes a minute leakage passageway communicating the chamber with the exterior of said block, and means forming a passageway heated by said block through which paint is adapted to be flowed and thus heated.

JAMES A. BEDE.

REFERENCES CITED

The following references are of record in the file of this patent:

UNITED STATES PATENTS

| Number | Name | Date |
|---|---|---|
| 1,062,896 | Dempster | May 27, 1913 |
| 1,162,537 | Yager | Nov. 30, 1915 |
| 1,277,621 | Macklind | Sept. 3, 1918 |
| 1,418,460 | Pfenninger | June 6, 1922 |
| 1,866,221 | Pennington | July 5, 1932 |
| 2,223,359 | Eisinga | Dec. 3, 1940 |
| 2,247,816 | McIlrath | July 1, 1941 |
| 2,277,291 | Blair | Mar. 24, 1942 |
| 2,302,924 | Valverde | Nov. 24, 1942 |

FOREIGN PATENTS

| Number | Country | Date |
|---|---|---|
| 364,664 | Great Britain | Jan. 4, 1932 |